US010119990B2

(12) United States Patent
Baur et al.

(10) Patent No.: US 10,119,990 B2
(45) Date of Patent: Nov. 6, 2018

(54) SCANNING PROBE MICROSCOPE AND METHOD FOR EXAMINING A SURFACE WITH A HIGH ASPECT RATIO

(71) Applicant: Carl Zeiss SMT GmbH, Oberkochen (DE)

(72) Inventors: Christof Baur, Darmstadt (DE); Klaus Edinger, Lorsch (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 15/386,203

(22) Filed: Dec. 21, 2016

(65) Prior Publication Data
US 2017/0102407 A1    Apr. 13, 2017

Related U.S. Application Data

(63) Continuation of application No. PCT/EP2015/063291, filed on Jun. 15, 2015.

(30) Foreign Application Priority Data

Jun. 26, 2014  (DE) .................. 10 2014 212 311

(51) Int. Cl.
*G01Q 10/04* (2010.01)
*G01Q 10/00* (2010.01)
(Continued)

(52) U.S. Cl.
CPC .......... *G01Q 10/045* (2013.01); *G01Q 10/00* (2013.01); *G01Q 10/06* (2013.01); *G01Q 10/065* (2013.01); *G01Q 70/14* (2013.01)

(58) Field of Classification Search
None
See application file for complete search history.

(56) References Cited

U.S. PATENT DOCUMENTS 5,103,095 A * 4/1992 Elings .................... G01Q 10/04
250/307
5,166,516 A * 11/1992 Kajimura ............... B82Y 35/00
250/234
(Continued)

FOREIGN PATENT DOCUMENTS

DE  101 06 854 A1  10/2001  ............. G12B 21/08
DE  101 10 933 B4   8/2013  ............. C01Q 10/00
(Continued)

OTHER PUBLICATIONS

"PRONANO: proceedings of the integrated project on massively parallel intelligent cantilever probe platforms for nanoscale analysis and synthesis", *Proceedings of the PROPANO Project*, published by Thomas Sulzbach and Ivo W. Rangelow, Muenster: Verlags-haus Monsenstein and Vannerdat, pp. 133, 193 and 194, ISBN: 978-3-86991-177-9. (Sep. 2010).
(Continued)

*Primary Examiner* — Michael Logie
(74) *Attorney, Agent, or Firm* — Fish & Richardson P.C.

(57) ABSTRACT

The invention relates to a scanning probe microscope, having: (a) a scanning device for scanning a measurement tip over a surface; (b) a cantilever for the measurement tip, wherein the cantilever has a torsion region; (c) wherein the torsion region is configured such that it undergoes torsion when a control signal is applied and thereby pivots the measurement tip; and (d) a control device for outputting the control signal when the measurement tip scans a region of the surface that can be examined more closely with a pivoted measurement tip than without pivoting the measurement tip.

26 Claims, 12 Drawing Sheets

(51) Int. Cl.
*G01Q 10/06* (2010.01)
*G01Q 70/14* (2010.01)

(56) References Cited

U.S. PATENT DOCUMENTS

| | | | | |
|---|---|---|---|---|
| 5,347,854 | A * | 9/1994 | Martin | G01Q 10/06 73/105 |
| 6,441,371 | B1 * | 8/2002 | Ahn | B82Y 35/00 250/307 |
| 8,458,810 | B2 | 6/2013 | McConney | |
| 2001/0028033 | A1 | 10/2001 | Shimizu et al. | |
| 2002/0020805 | A1 | 2/2002 | Shimizu et al. | |
| 2003/0233870 | A1 * | 12/2003 | Mancevski | B82Y 35/00 73/105 |
| 2005/0012936 | A1 | 1/2005 | Murayama et al. | |
| 2005/0028583 | A1 | 2/2005 | Su et al. | |
| 2006/0156798 | A1 * | 7/2006 | Mancevski | B82Y 10/00 73/105 |
| 2007/0037300 | A1 * | 2/2007 | Qin | G01N 21/73 438/14 |
| 2008/0011065 | A1 | 1/2008 | Su et al. | |
| 2012/0260374 | A1 * | 10/2012 | McConney | B82Y 35/00 850/1 |
| 2015/0247881 | A1 * | 9/2015 | Su | G01Q 30/06 850/1 |

FOREIGN PATENT DOCUMENTS

| | | | | |
|---|---|---|---|---|
| JP | 08-094651 | | 4/1996 | G01N 37/00 |
| JP | 09267278 | A * | 10/1997 | B25J 15/08 |
| JP | 2005-331509 | | 12/2005 | G01N 13/16 |
| JP | 2006-276027 | | 10/2006 | G01N 13/16 |
| WO | WO 2012/104625 | | 8/2012 | B82Y 35/00 |

OTHER PUBLICATIONS

Villarrubia, J.S., "Algorithms for Scanned Probe Microscope Image Simulation, Surface Reconstructions, and Tip Estimation", *Journal of Research of the National Institute of Standards and Technology*, vol. 102, No. 4, pp. 425-454 (Jul.-Aug. 1997).
Akiyama T et al: "Fast driving technique for integrated thermal bimorph actuator toward high-throughput, atomic-force microscopy", *Review of Scientific Instruments*, vol. 73, No. 7, pp. 2643-2646 (Jul. 2002).
Sang-Joon Cho et al., "Three-dimensional imaging of undercut and sidewall structures by atomic force microscopy", *Review of Scientific Instruments*, pp. 82, 023707-1-023707-5 (2011).
G. Dai et al.: "Development of a 3D-AFM for true 3D measurements of nanostructures", *Measurement Science and Technology*, 22, 094009 (2011).
Dong Hyun Kim et al., "Analysis and Design of Thermal Double-Cantilever Bimorph Actuators for Rotating-Type Micromirrors", *Proc. of MNHT2008, Micro/Nanoscale Heat Transfer Internat. Conf.*, Tainan, Taiwan, Jan. 6-9, 2008, pp. 1063-1067 (2008).
S.R. Manalis et al., "Atomic force microscopy for high speed imaging using cantilevers with an integrated actuator and sensor", *Applied Physics Letters*, American Institute of Physics, US, vol. 68, No. 6, pp. 871-873 (Feb. 5, 1996).
Manalis S. R. et al: "High-speed atomic force microscopy using an integrated actuator and optical lever detection", *Review of Scientific Instruments*, vol. 67, No. 9, pp. 3294-3297 (Sep. 1996).
Yves Martin et al., "Method for imaging sidewalls by atomic force microscopy", *Appl. Phys. Lett.* vol. 64, No. 19, pp. 2498-2500 (May 9, 1994).
Y. Sarov et al., "Controllable off-plane deflection of cantilevers for multiple scanning proximity probe arrays", *Appl. Phys.* A, 92: pp. 525-530 (2008).
Park Systems Corporation, "High Throughput and Non-Destructive Sidewall Roughness Measurement Using 3-Dimensional Atomic Force Microscopy" (https://www.parkafm.com/images/applications/semiconductors/note/1_Park_Systems_App_Note_Sidewall_Roughness_2012_03_14.pdf). (2012).
International Search Report for International Application No. PCT/EP2015/063291 dated Aug. 31, 2015 (3 pages).
Japanese Office Action for Japanese Application No. 2016-575527 dated Mar. 5, 2018.

* cited by examiner

Fig. 2 (Prior Art)
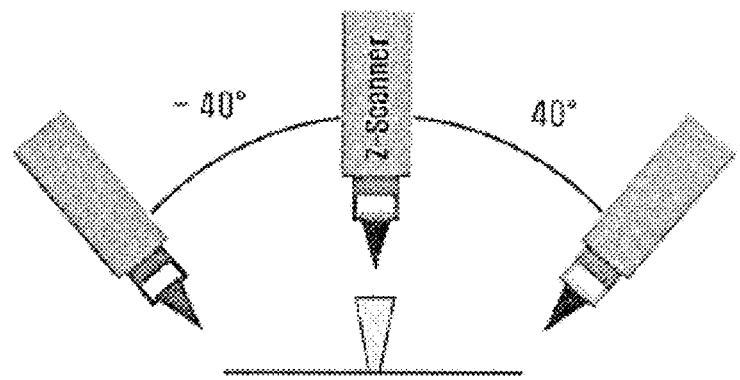
Fig. 3A (Prior Art)    Fig. 3B (Prior Art)
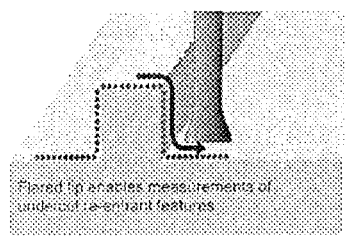 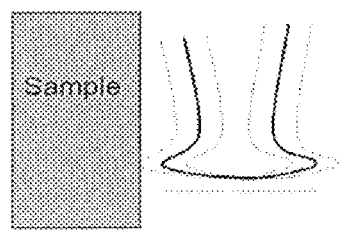

SCANNING PROBE MICROSCOPE AND METHOD FOR EXAMINING A SURFACE WITH A HIGH ASPECT RATIO

CROSS REFERENCE TO RELATED APPLICATIONS

This application is a continuation of International Application PCT/EP2015/063291, having a filing date of Jun. 15, 2015, which claims priority to German patent application 10 2014 212 311.9, filed on Jun. 26, 2014. The entire contents of the above applications are hereby incorporated by reference.

TECHNICAL FIELD

The present invention relates to a scanning probe microscope and to a method for examining a surface with a high aspect ratio.

BACKGROUND

Scanning probe microscopes scan a sample or the surface thereof with a probe and thereby provide measurement data for producing a representation of the topography of the sample surface. In the following text, scanning probe microscopes will be shortened to SPM. A distinction is made between various SPM types, depending on the type of interaction between the measurement tip of a probe and the sample surface. Frequently, scanning tunneling microscopes (STM) are used in which a voltage is applied between the sample and the measurement tip, which are not in contact with one another, and the resulting tunnel current is measured.

In the case of the scanning force microscope (SFM, or AFM for atomic force microscope), the measurement tip is deflected by way of atomic forces of the sample surface, typically van der Waals forces. The deflection of the measurement tip is proportional to the force acting between measurement tip and the sample surface, and this force is used to determine the surface topography. In the article "Controllable off-plane deflection of cantilevers for multiple scanning proximity probe arrays," Appl. Phys. A (2008), 92: 525-530, DOI 10.1007/s00339-008-4668-y, the authors Y. Sarov, T. Ivanov and I. W. Rangelow describe the manufacture of a measurement probe with a two-dimensional arrangement of 4×32 measurement tips.

In addition to these common SPM types, there are a multiplicity of further device types which are used for specific fields of application, such as magnetic force microscopes or near-field scanning optical and acoustic microscopes.

Typical SPM types may have difficulty analyzing structures on a sample which have a high aspect ratio, i.e. a high quotient of depth or height of a structure to its smallest lateral extent. For this reason, standard SPMs can image deep trenches and steep flanks to only a limited extent. The limiting effect here is the finite radius of the measurement tip of SPM probes, in particular the cone angle thereof. FIG. 1A schematically shows the problem of an SPM probe during the scanning of a web. The dotted lines in FIG. 1B symbolize the difficulties arising during the measurement of the flanks of a high web having steep flanks.

Various approaches are known already for solving this problem. In the article "Three-dimensional imaging of undercut and sidewall structures by atomic force microscopy" in Ref. Sci. Instr. 82, pp. 023707-1 to 023707-5 (2011), the authors Sang-Joon Cho, Byung-Woon Ahn, Joonhui Kim, Jung-Min Lee, Yueming Hua, Young K. Yoo and Sang-il Park describe the pivoting of the AFM measurement head or of the Z scanner by ±40° from the normal of the sample surface so as to lead the measurement tip of the AFM probe along steep flanks, in particular overhanging webs. FIG. 2 schematically shows the pivoting or tilting of the Z scanner. This image was taken from the application document "High Throughput and Non-Destructive Sidewall Roughness Measurement Using 3-Dimensional Atomic Force Microscopy" from Park Systems Corporation (https://www.parkafm.com/images/applications/semiconductors/note/1_Park_Systems_App_Note_Sidewall_Roughness_2012_03_14.pdf).

The technical layout for manufacturing the precision mechanism for pivoting the entire AFM measurement head is enormous. In addition, the space required by the AFM becomes very large. If the fulcrum of the measurement tip is then not exactly eucentric, which is a frequent occurrence, the tilting of the AFM measurement head also results in a lateral displacement of the measurement tip of the AFM probe, which makes the navigation on the sample significantly more difficult.

In a second approach, a measurement tip in the form of what is known as an elephant foot (flared tip) is used instead of a needle-type measurement tip. FIGS. 3A and 3B schematically show such a measurement tip which is guided perpendicular to a web and across it. This principle was first described by the authors Yves Martin and H. Kumar Wickramasinghe in their article "Method for imaging sidewalls at atomic force microscopy" in Appl. Phys. Lett. 64 (19), 9 May 1994, pp. 2498-2500. In addition to the typical way of controlling the movement of the measurement tip in the z-direction (the sample normal), a second way of controlling it in the x-direction (the fast scan direction) is used so as to guide the elephant foot probe over steep flanks or under overhangs.

Elephant foot probes for AFM measurement heads are very difficult to produce and are therefore very expensive. The construction of a second feedback loop furthermore leads to very complex and thus expensive AFMs. In addition, retrofitting existing AFMs with elephant foot probes is possible only with difficulty.

In the article "Analysis and design of thermal double-cantilever bimorph actuators for rotating-type mirrors," the authors Dong Hyun Kim, Kyung su Oh, Seungho Park, Ohmyoung Kwon, Young Ki Choi and Joon Sik Lee describe in Proc. of MNHT2008, Micro/Nanoscale Heat Transfer Internat. Conf., Tainan, Taiwan, Jan. 6-9, 2008, pp. 1063-1067, a micro-electromechanical system (MEMS) consisting of two bimetal beams for adjusting a micromirror.

The Japanese patent application JP 08-094651 discloses an AFM probe, the cantilever of which has three beams of piezoresistive material. A voltage is applied to the central beam, the deflection of the cantilever is determined from the sum signal of the two external beams, and the torsion or bending of the cantilever is ascertained from the difference signal of the two external beams.

Patent document U.S. Pat. No. 8,458,810 B2 discloses a cantilever of an AFM probe having two materials in an asymmetric arrangement with respect to the longitudinal axis of the AFM probe. The two materials have different coefficients of linear expansion. The measurement tip of the cantilever is hereby deflected in a lateral direction in the case of a temperature change of the cantilever. Owing to the asymmetric arrangement of bimorph materials on the cantilever, a thermal signal portion (lateral deflection) can be isolated from a topographic signal portion (deflection of the cantilever in the normal direction).

The two documents mentioned last deal with the objective of separating thermal from topographical portions in measurement signals supplied by AFM probes so as to hereby allow thermal measurements. The problem when determining steep high flanks or overhanging structures is not addressed by any of said documents.

SUMMARY

In a general aspect, the present invention provides an apparatus and method, with the aid of which structures with a high aspect ratio can be analyzed reliably.

According to one exemplary embodiment of the present invention, an apparatus comprises a scanning probe microscope, having: (a) a scanning device for scanning a measurement tip over a surface; (b) a cantilever for the measurement tip, wherein the cantilever has a torsion region; (c) wherein the torsion region is configured such that it undergoes torsion when a control signal is applied and thereby pivots the measurement tip; and (d) a control device for outputting the control signal when the measurement tip scans a region of the surface that can be examined more closely with a pivoted measurement tip than without pivoting the measurement tip.

One exemplary embodiment of an apparatus according to the invention makes the use of measurement tips with normal radius of curvature and cone angle of a conical measurement tip possible and thus allows the high resolution capability of traditional scanning probe microscopes when scanning surfaces without a high aspect ratio even for samples that have a high aspect ratio. By pivoting the measurement tip for scanning steep high flanks, the defined scanning probe microscope permits access to corners or overhanging portions of flanks whose measurement is not accessible to traditional SPMs.

The angle of the measurement tip relative to the starting position without pivoting is set before a rastering or scanning operation is performed. It is thus possible to scan a region of a sample with a measurement tip whose pivot angle is matched to the topology of the sample surface.

If the structure of the surface topology is not known, a sample region can be scanned in a first scan without pivoting the measurement tip. A pivot angle of the measurement tip is determined for a second scan from the image that is generated from the measurement data. The sample region to be examined is scanned again, now with a pivoted measurement tip. Subsequently, a realistic second image of the sample surface will be generated from the measurement data of the two scans of the same region of the sample. If the second image gives rise to the assumption that the second image of the sample surface does not yet match reality, the region to be examined of the sample can be scanned again at a different pivot angle of the measurement tip. This process can be repeated until a realistic image of a sample region to be examined is obtained.

The pivoting of the measurement tip additionally only requires the movement of a minimum mass. The measurement tip can therefore be pivoted or deflected very quickly and reproducibly during a scan operation. It is thus conceivable when using an apparatus according to the invention that the pivot angle of the measurement tip is changed during a scan by the measurement tip and thus matched to the topology of the sample surface.

A scanning probe microscope typically has easily interchangeable measurement probes and a control device, which can be configured in modular fashion, for generating a control signal. Existing facilities can therefore be retrofitted with the above-defined apparatus.

In one further aspect, the torsion region comprises at least in a partial region at least two material layers which are connected to one another and have different coefficients of thermal expansion. According to another aspect, at least a partial region of the torsion region comprises implanted material, with the result that the partial region and the torsion region have different coefficients of thermal expansion.

According to one further aspect, the torsion region comprises at least one first region having at least two first material layers, which are connected to one another, for setting approximate pivoting of the measurement tip, and comprises at least one second region having at least two second material layers, which are connected to one another, for setting fine pivoting of the measurement tip, or the torsion region comprises at least two partial regions of implanted material for setting approximate pivoting and a fine pivoting of the measurement tip.

A connection of two or more materials having different thermal expansions bends in case of a temperature change of the connection. If the torsion region has two or more material layers which are connected to one another in an arrangement that is asymmetric with respect to a section plane of the cantilever through the measurement tip, the torsion region of the cantilever undergoes torsion in case of a temperature change, and thus also the cantilever. This effect can likewise be achieved by implanting asymmetric material into the torsion region of the cantilever.

Alternatively, in the case of an asymmetric temperature change with respect to the section plane, a symmetric arrangement of at least two materials in the torsion region and/or of implanted material with respect to the section plane defined in the previous paragraph likewise results in the torsion region and thus the cantilever undergoing torsion and ultimately in the measurement tip being pivoted or tilted.

Since the torsion region has two or more regions of two or more material layers which are connected to one another or two or more partial regions of implanted material, two or more parameters are available for bringing about a local temperature change so as to deliberately and precisely match the deflection of the measurement tip out of the section plane to a surface to be examined of a sample.

According to another aspect, the torsion region extends over the entire recording unit. In one preferred aspect, the region of the at least two material layers which are connected to one another extends over the entire cantilever, or the at least one partial region of implanted material extends over the entire cantilever.

This embodiment of a cantilever can be manufactured easily and thus cheaply, since the two or more material layers can extend over the entire cantilever. By selecting for example a local asymmetric temperature change with respect to the above-defined section plane within the torsion region, it is possible for the torsion of the cantilever and thus the pivoting of the measurement tip to be flexibly matched to the requirements of different applications.

In one favorable aspect, the region of the at least two material layers which are connected to one another or the at least one partial region of implanted material comprises a bimetal element.

If materials having strongly differing coefficients of thermal expansion are used for the material layers or for the implanted material and the remaining torsion region of the cantilever, even small temperature changes result in significant torsion of the torsion region of the cantilever.

In one further aspect, the torsion region has a material in an arrangement that is configured, when the control signal is applied, to keep a first portion of the arrangement substantially at a first temperature, and to keep a second portion of the arrangement substantially at a second temperature, wherein the first temperature differs from the second temperature.

A thus defined torsion region makes do with one material and is thus likewise cost-effective with respect to the manufacture of a cantilever. By matching the configuration of the torsion region, it is possible in a simple manner to meet the requirements of different applications.

In another preferred aspect, the scanning probe microscope furthermore has a laser system which is configured to locally heat the torsion region when the control signal is applied.

A laser beam can be focused to a small focal spot. In addition, its point of incidence can be precisely adjusted onto the torsion region. It is thus possible with the aid of a laser beam to selectively heat a portion of the material system of the torsion region. As a result, a laser beam can bring about the above-mentioned preferred asymmetric temperature change. A laser beam is therefore very well suited, by way of the deflection of the measurement tip out of the specified section plane, to match it quickly and in a targeted fashion to the topography to be examined of a sample surface.

In one further favorable aspect, the scanning probe microscope has a heating apparatus which is configured to locally heat the torsion region when the control signal is applied. According to another aspect, the scanning probe microscope has at least one heating resistor which is mounted in the region of the torsion region and is configured to locally heat the torsion region when the control signal is applied.

A localized heating apparatus, for example in the form of a heating resistor, can selectively heat a portion of the torsion region and thus bring about a preferred asymmetric temperature distribution with respect to the above-mentioned section plane in the torsion region.

According to one favorable aspect, at least one of the at least two material layers which are connected to one another or at least one partial region of implanted material comprises at least one heating resistor.

Since one of the two material layers or the at least one partial region of implanted material assumes two functions, a torsion region of a cantilever does not have a complex structure and can thus be manufactured cost-effectively. The two functions are, on the one hand, to be part of a bimorph structure of the torsion region and, on the other hand, to serve as an electric resistor for generating an asymmetric temperature distribution in the torsion region of the cantilever.

In yet another preferred aspect, the torsion region comprises at least one piezo actuator.

The use of a piezo actuator as the torsion region of a recording unit of a measurement probe has the advantage that the piezo actuator quickly reacts to a control signal. As a result, the measurement tip can be deflected dynamically to both sides of the above-defined section plane and thus be adapted to the structure of the sample surface to be scanned.

According to a further aspect, the recording unit is configured as a microelectromechanical system.

According to another aspect, the control device is configured to modulate the control signal so as to excite the measurement tip to oscillate.

A modulation of the heating can be used to excite the measurement tip to vibrate. In the case of a symmetric torsion region and asymmetric variation of the temperature with respect to the above-stated section plane, the vibration of the measurement tip takes place substantially in the z-direction, i.e. a direction perpendicular to the sample surface. In the case of an asymmetric variation of the temperature within a symmetric torsion region, the vibration of the measurement tip takes place predominantly in the x-direction, i.e. perpendicular to the defined section plane.

The expression "substantially" here, and also at different locations in this specification, means a measurement accuracy pertaining to measuring instruments which are currently available.

In one preferred aspect, the torsion region of the cantilever is configured to pivot the measurement tip at an angle range of ±5°, preferably ±10°, with stronger preference ±15°, and with strongest preference by ±20°.

According to another favorable aspect, the cantilever and the measurement tip have a resonant frequency in the range of 100 Hz-5 MHz, preferably 500 Hz-1 MHz, with stronger preference 1 kHz-500 kHz, and with strongest preference 2 kHz-200 kHz. According to yet another aspect, the cantilever has a spring constant in the range of 0.001 N/m-600 N/m, preferably 0.02 N/m-300 N/m, with stronger preference 0.04 N/m-150 N/m, and with strongest preference 0.08 N/m-80 N/m.

According to an advantageous aspect, the scanning device is configured to extend a distance feedback loop for the z-movement to a z-x-movement, wherein the x-direction indicates a fast scan direction. In yet another aspect, the scanning device is configured to add a signal of the z-movement to a signal for the x-movement.

When scanning the surface with a low aspect ratio, the movement of the measurement tip is substantially a movement in the x-direction, i.e. a movement parallel to the sample surface. An oscillation of the measurement tip in the z-direction, i.e. a movement perpendicular to the sample surface, can be superposed on the scanning movement of the measurement tip in the x-direction. When scanning a steep high flank, it is favorable for recording the measurement data if the measurement tip is controlled at an angle which is as large as possible with respect to the flank to be scanned. This can be achieved in part by adding the z-movement of the measurement tip to the movement in the fast scan direction. It is furthermore possible to add the movement of the measurement tip in the z-direction to the slow scan direction.

The fast scan direction in this application refers to the direction in which a scanning probe microscope scans a given surface in line-wise fashion. The direction on the sample surface that is perpendicular to the line-wise scan direction is referred to as the slow scan direction.

According to yet another aspect, the cantilever has an attachment unit in which electrical connections are integrated which leads to the torsion region.

Probes of scanning probe microscopes are nowadays preferably automatically interchangeable. Since the electrical connections for a heating apparatus are integrated in the attachment unit, it is also possible for probes having a pivotable measurement tip to be interchanged automatically, i.e. without manual interaction. The result is simple usability of a scanning probe microscope. The above-defined scanning probe microscopes can thus be used, for example, in a manufacturing environment. Automatic probe interchange furthermore secures high reproducibility and reliability. On account of the automation of the probe interchange, it is additionally possible to achieve short probe interchange times of less than a minute. This is favorable in particular for probe microscopes which operate in a vacuum environment.

According to a further preferred aspect, the cantilever has at least one sensor for determining the pivoting of the measurement tip.

Sensors for determining the pivoting of the measurement tip can preferably be attached in the form of piezoresistive sensors to the upper side and/or underside of the torsion region of a cantilever.

According to one further aspect, the scanning probe microscope furthermore has a detection device which is configured to determine from a topography of the surface and a contour of the measurement tip whether a region to be scanned can be examined more accurately with the pivoted measurement tip than without pivoting the measurement tip.

In one embodiment, a method for examining a surface with a high aspect ratio includes: (a) scanning a measurement tip over the surface wherein the measurement tip is attached to a cantilever and the cantilever has a torsion region; (b) applying a control signal when the measurement tip scans a region of the surface which can be examined more accurately with a pivoted measurement tip than without pivoting the measurement tip; and (c) subjecting the torsion region to torsion for pivoting the measurement tip.

According to one further aspect, the method has the step of: detecting a topography of the surface, which substantially corresponds to the contour of the measurement tip for determining whether the measurement tip should be permitted.

According to one further aspect, the method has the step of: deciding whether the measurement tip is pivoted on the basis of the detected height change of the surface.

The angle of the measurement tip relative to the initial position is preferably set without pivoting before a scan operation is carried out. It is thus possible to scan a region of a sample with a measurement tip whose pivot angle is matched to the topology of the sample surface. However, one method according to the invention permits detection of a steep high flank during a scan operation and an increase in the accuracy of the scanning of a sample surface by way of correspondingly tilting the measurement tip. Since the measurement tip can be pivoted out of the above-defined section plane during a scan process, a method according to the invention is suitable for examining irregular structural elements with a high aspect ratio.

According to yet another aspect, a scanning probe microscope according to one of the preceding aspects is used for carrying out at least one of the above-mentioned method steps.

BRIEF DESCRIPTION OF DRAWINGS

The following detailed description describes currently preferred exemplary embodiments of the invention, with reference being made to the drawings, in which:

FIG. 2 schematically shows the pivoting of the measurement head of an atomic force microscope for scanning the overhanging flanks of a web;

FIGS. 3A and 3B show a schematic illustration of the scanning of a web having substantially perpendicular flanks with a probe in the shape of an elephant foot, wherein scanning in the region of the flanks is carried out by way of feedback-controlling the probe in the x-direction or in the scan direction;

DETAILED DESCRIPTION

Figures 1A, 1B:
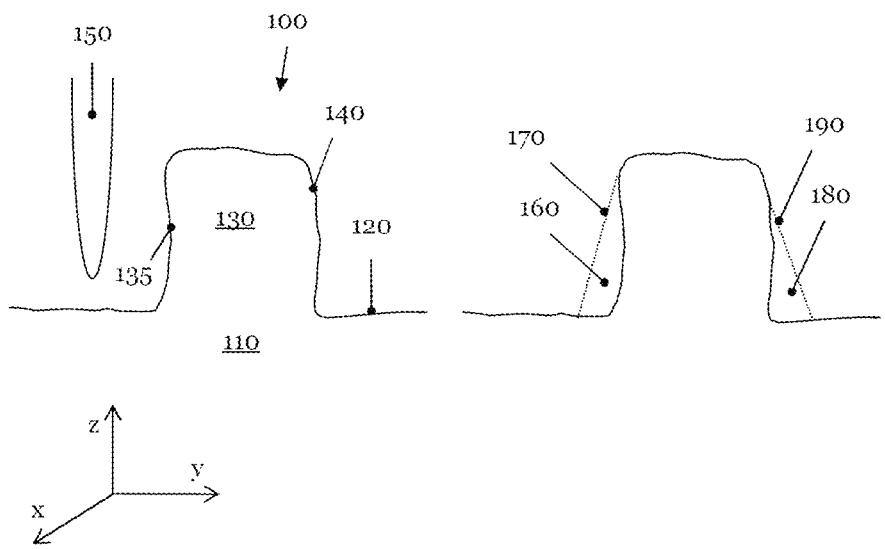
FIG. 1A schematically illustrates the scanning with a measurement tip of a probe or a measurement probe of a scanning probe microscope from the prior art as it scans a steep high web.
FIG. 1B schematically symbolizes the regions around the steep high web in FIG. 1A which cannot be reliably analyzed with a measurement tip of a scanning probe microscope from the prior art.

Referring to FIG. 1A, the difficulties of traditional scanning probe microscopes when scanning structures with a high aspect ratio are briefly discussed. Then, currently preferred embodiments of an apparatus according to the invention and a method according to the invention will be explained in more detail.

Diagram 100 in FIG. 1A schematically shows a sample 110 having a sample surface 120 with a high web 130. The web 130 has a steep 140 and partially overhanging flank 135. A measurement tip 150 of a traditional scanning probe microscope can scan the sample surface 120 and the surface of the web 130 with a high lateral resolution. As is symbolized schematically in FIG. 1B by way of dotted lines 170 and 190, the measurement tip 150 can analyze the flanks 135 and 140 of the web 130 only insufficiently, with the result that a traditional scanning probe microscope cannot deliver resilient measurement data in the regions 160 and 180 around the web 130.

Figure 4:
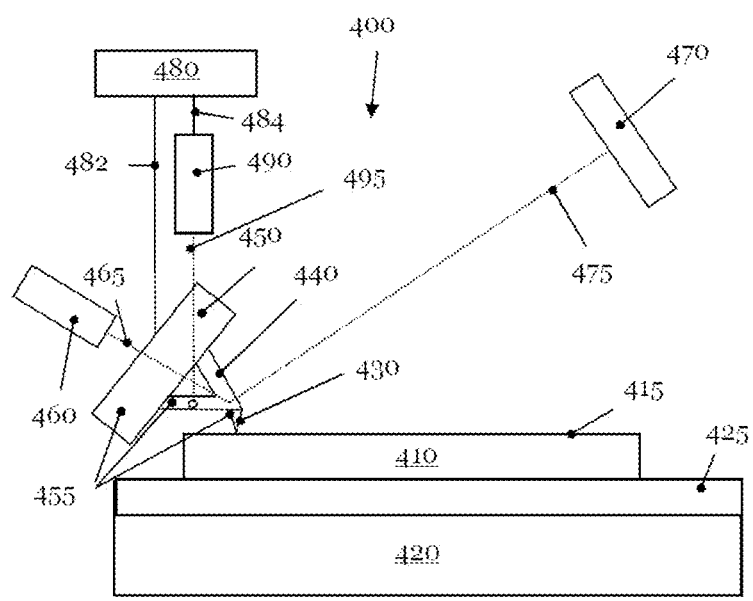
FIG. 4 shows a schematic illustration of a few important components of an atomic force microscope according to the invention.

FIG. 4 schematically shows a few components of a scanning probe microscope 400 defined in the third section. Scanning probe microscopes are differentiated according to the measurement variable used for examining the sample 410. Scanning tunneling microscopes (STMs) use the tunnel current between the sample 410 and the measurement tip 430 which occurs when a voltage is applied between the sample 410 and the measurement tip 430 in order to analyze the topography of the surface 415 of the sample 410. Atomic force microscopes (AFMs) ascertain the surface contour of the sample 410 from the deflection of the measurement tip 430 by the sample 410. Magnetic force microscopes (MFMs) measure the magnetic forces between the sample 410 and the measurement tip 430. Scanning near-field optical microscopes (SNOMs) use evanescent electromagnetic waves as interaction between the sample 410 and the measurement tip 430. Scanning near-field acoustic microscopes (SNAMs) use acoustic near-field interactions for scanning the surface topography of the sample 410. This list of scanning probe microscopes is not complete.

The principle for pivoting the measurement tip 430 disclosed in this application can be applied to the probes of all types of scanning probe microscopes that have a cantilever, i.e. an elastically bendable lever arm, or a spring beam for short. Scanning probe microscopes, the probes of which have no cantilevers, must be fitted with a cantilever before they are used in the configuration described in this application. This principle will be explained below by way of exemplary probes for an atomic force microscope (AFM).

The atomic force microscope 400 illustrated in FIG. 4 can be operated under ambient conditions or in a vacuum chamber (not illustrated in FIG. 4). The sample 410 to be analyzed is arranged on a sample stage 425. The sample stage 425 can be moved in three spatial directions by way of a scanning device 420. The scanning device 420 comprises for example one or more micro-displacement elements, for example in the form of piezo actuators (not shown in FIG. 4).

The probe 455 or the measurement probe 455 comprises a tip 430 or a measurement tip 430 and a cantilever 440 for the measurement tip 430. The cantilever 440 comprises a resiliently bendable lever arm or a spring beam. The cantilever 440 has, at the end that is located opposite the measurement tip 430, an attachment unit 450 with which the probe 455 is attached to a holding apparatus (not shown in FIG. 4) of the atomic force microscope (AFM) 400. The holding apparatus can be connected to the measurement head of the AFM 400 via a piezo actuator (not illustrated in FIG. 4). The piezo actuator which connects the measurement probe 455 to the holding apparatus of the AFM measurement head can likewise perform the function of a scanning device. Alternatively or additionally, the relative movement between the sample surface 415 and the measurement tip can, in another embodiment, be split between the scanning device 420 and the piezo actuator which connects the measurement probe 455 with the holding apparatus. For example, the scanning device 420 performs the movement of the sample 410 in the sample plane (x-y plane), and the above-mentioned piezo actuator performs the movement of the measurement tip 430 in the direction of the sample normal (z-direction).

However, the sample stage 425 is preferably configured to be locationally fixed and the measurement tip 430 is brought to the region of the sample 410 to be analyzed by use of micro-displacement elements (not shown in FIG. 4).

The measurement tip 430 of the probe 455 can operate in a plurality of operating modes. For one, it can be scanned over the surface 415 of the sample 410 at a constant height without feedback control. Alternatively, the probe 455 can be guided over the sample surface 415 with a constant force in a closed feedback loop. It is furthermore possible with the aid of a modulation method to make the cantilever 440 oscillate perpendicular to the sample surface 415 and as a result to scan the surface 415 of the sample 410 in a closed feedback loop. Here, the cantilever 440 can oscillate at its resonant frequency or carry out a forced oscillation at a specified frequency. In the former case, i.e. the cantilever 440 or the probe 455 oscillates in frequency, a frequency modulation (FM) demodulation occurs, in which case the frequency change brought about by the interaction between the measurement tip 430 and the sample 410 is measured. In the case of a forced oscillation near the resonant frequency, an amplitude modulation (AM) demodulation is carried out in order to detect the amplitude of the oscillation which is changed owing to the interaction between the measurement tip 430 and the sample surface 415.

In order to measure the deflection of the measurement tip 430 or of the cantilever 440 by the surface 415 of the sample 410, in one embodiment of the atomic force microscope 400, a laser system 460 directs a laser beam 465 onto the tip of the cantilever 440. The laser beam 465 which is reflected by the cantilever 440 is recorded by a photodetector 470. The photodetector 470 frequently has a four-quadrant configuration. As a result, it is possible to not only measure a z-movement of the measurement tip 430 (i.e. perpendicular to the sample surface 415), but also a movement of the measurement tip 430 in the x-direction, i.e. pivoting of the tip 430. In the prior art, lateral forces occur mainly in contact mode, where the measurement tip 430 is guided over the sample 410 in contact with the surface 415. The lateral forces give an indication of the material of a just examined sample surface 415.

For a measurement probe 455 defined in this application, the signal of a four-quadrant configuration of a photodetector 470 can be used to determine pivoting of the measurement tip 430 which is not caused by a control signal or adjustment signal applied to the cantilever 440.

Alternatively, an interferometer can be used to ascertain the pivoting of a measurement tip 430 (not shown in FIG. 4). Examples of interferometer types that can be used for this purpose are a Michelson interferometer or a Mach-Zehnder interferometer. In addition, a deflection of the measurement tip 430 can also be detected with the aid of piezoresistive elements or sensors of the cantilever 440 (not illustrated in FIG. 4). It is moreover also possible for the deflection of the measurement tip 430 to be determined from a combination of optical signals and the measurement data of piezoresistive elements (likewise not shown in FIG. 4).

The atomic force microscope 400 furthermore has a control device 480. The latter is connected to a second laser system 490 by a supply line 484 for a control signal. In the example illustrated in FIG. 4, the laser beam 495 of the second laser system 490 is directed onto one of the arms or beams of the cantilever 440 of the probe 455 so as to bring about local heating of the beam or of the arm of the cantilever 440.

No special requirements are made of the second laser system 490. Its wavelength can be arbitrarily chosen. However, wavelengths in the visible range of the electromagnetic spectrum facilitate the adjustment of the laser beam 495. An output of a few mW suffices to locally heat a portion of the cantilever 440. In order to achieve local heating of a portion of the cantilever 440, focusing on a focal spot of <10 μm is necessary. These requirements pose no problem for modern laser systems. It is advantageous if the wavelengths of the two laser systems 460 and 490 differ. In that case it is possible to use a filter to prevent disturbance of the signal of the photodetector 470 by the laser 490 (for example by stray light).

In addition, the control device 480 has a second connection 482 to the attachment unit 450. Control signals can be delivered to the cantilever 440 of the probe 455 via the connection 482. In the following figures, a number of exemplary cantilevers 440 of probes 455 for atomic force microscopes 400 will be introduced. The deflections of the measurement tips caused by control signals or adjustment signals being applied to the cantilevers of the measurement probes via the connections 482 and/or 484 will also be discussed.

Figure 5:
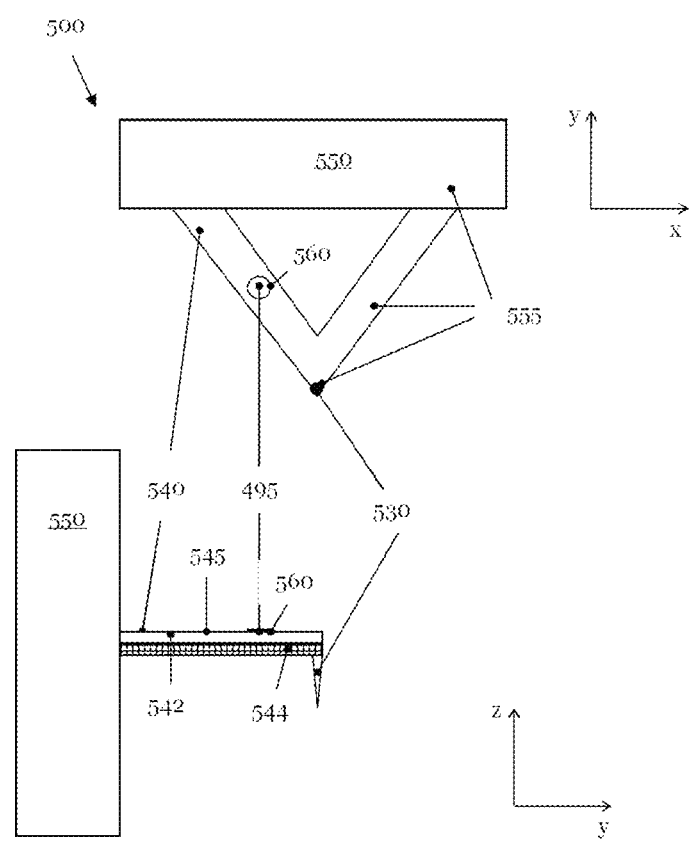
FIG. 5 schematically shows a plan view (top) and a section (bottom) through a probe of an atomic force microscope having a V-shaped cantilever.

Diagram 500 in FIG. 5 shows, in the top portion, a plan view of a probe 555, and in the bottom portion a section through the plane of symmetry of the probe 555 and the measurement tip 530. The y-z-plane illustrated in the bottom portion of FIG. 5 corresponds to the section plane through a cantilever and the measurement tip thereof defined in the third part. As already explained above in the context of the discussion of FIG. 4, the probe 555 has a measurement tip 530, a cantilever 540 and an attachment unit 550. The cantilever 540 in the example illustrated in FIG. 5 has a torsion region 545 which extends over the entire cantilever 540. The torsion region 545 comprises two layers 542 and 544, which are arranged one above the other and have different coefficients of thermal expansion. The two layers 542 and 544 of the torsion region 545 can be made up for example of semiconducting and/or electrically insulating materials. One example of a semiconducting layer that is mentioned here is silicon (Si), and an example of an insulator material is silicon nitride (Si3N4). It is furthermore possible for one of the two layers 542 and 544 to comprise a metal layer, such as an aluminum or chromium layer, and for the other one to comprise a semiconducting or an electrically insulating layer. Moreover, all materials are conceivable for the two layers 542 and 544, as long as they have different coefficients of linear thermal expansion.

It is also possible to implant material of a different element or a different compound into the entire material of the cantilever 540 or into partial regions thereof up to a specific depth in order to produce a second layer having a different linear expansion than that of the material of the cantilever 540. Here, methods and materials known from semiconductor production can be used. Implantation can be performed from the upper side of the cantilever 540 (i.e. the side that is remote from the measurement tip 530) and/or from the underside of the cantilever 540 (i.e. the side having the measurement tip 530).

The measurement tip 530 can be made of the material of the bottom layer 544, of the material of the top layer 542 of the cantilever 540 or of a different material. This likewise applies to the attachment unit 550. That means that the measurement tip 530, one of the layers 542 and 544, and the attachment unit 550 can be made in one piece. Alternatively, individual ones or all of the components of the probe 555 can be produced separately from suitable materials and then connected, such as by adhesive bonding.

A uniform temperature change of the torsion region 545 of the cantilever 540 results in a movement or a deflection of the measurement tip 530 in the y-z-plane. A nonuniform or local temperature change of the torsion region 545 on the other hand results in a movement of the measurement tip 530 predominantly in the x-y-plane, more specifically in an additional tilting of the measurement tip in the −x-direction or the +x-direction. Overall, a local temperature change in the torsion region results in a superposition of the deflection of the measurement tip 530 in the y-z-plane and the x-y-plane.

A local heating of an arm or a beam of the cantilever 540 can be brought about for example by locally irradiating a beam at a position 560 using the laser beam 495 of the laser system 490. The tilting or pivoting of the measurement tip 530 is in a first approximation proportional to the light output introduced into the torsion region 545 at the position 560. In addition to the light output of the laser beam 495, the extent of the tilting of the measurement tip 530 also depends on the position 560 at which the laser beam 495 is incident on the torsion region 545. The absorption coefficient of the material, on which the laser beam 495 is incident, and the specific heat conduction thereof also influence the pivot angle of the measurement tip 530.

The deflection of the measurement tip 530 in the −x-direction or in the +x-direction occurs when a control signal of the control device 480 is applied to the laser system 490 via the connection 484 on the basis of the low mass of the cantilever 540 with a very short time constant in the range of microseconds. The duration from first instance of the laser beam 495 at the position 560 on the torsion region 545 until a thermal equilibrium has been established within the torsion region 545 or the cantilever 540 depends strongly on the thermal conductivity of the materials of the layers 542 and 544. In addition, this time constant is influenced strongly by the expansion of the cantilever 540 and the volume and material of the attachment unit 550. The thermal time constant therefore varies in a range of a few microseconds to milliseconds. The time constant with which the cantilever 540 returns to the thermal equilibrium after the laser beam 495 is switched off by the control device 480 is generally greater.

In order for the measurement tip 530 to remain pivoted during its scanning process, the local temperature gradient must thus be maintained by way of the continuous introduction of energy. If the measurement probe 555 is operated in modulated fashion, the cantilever 540 oscillates in the z-direction. However, the amplitude of the cantilever oscillation is generally small (<1 μm), with the result that it has only a negligible influence on the local heating through the laser beam 495 of the laser 490.

The local temperature increase in the region of the position 560 not only depends on the output of the laser beam 495 but also on the materials 542 and 544 and the position 560 of the laser beam 495 within the torsion region 545. Maximum local temperature increases ΔT are in the range of a few K (Kelvin).

In FIG. 5, a single laser beam 495 locally heats the torsion region 545 at the position 560. However, it is also possible to heat an arm or beam of the torsion region 545 uniformly across a larger area by way of multiple laser beams with points of incidence that are arranged along an arm of the torsion region 545 (not shown in FIG. 5). To this end, two or more laser beams can be diverted from the laser beam 495 of the second laser system 490. In one alternative embodiment, a dedicated laser system can be used for each laser beam (not illustrated in FIG. 4). Alternatively, an elliptical focus can be produced with the aid of a cylindrical lens to be used for uniformly heating a greater area of the torsion region 545. If laser diodes are used as the laser 490, the use of a cylindrical lens can be dispensed with, since semiconductor lasers typically already have an elliptical beam (not shown in FIG. 4).

The exemplary torsion region 545 illustrated in FIG. 5 has two materials with different coefficients of thermal expansion. It is also possible for three or more materials to be arranged one above another in the torsion region 545. In the arrangement of three or more different materials, one above another, care needs to be taken, however, that the resonant frequency of the cantilever 540 remains in the range of 10 kHz to 100 kHz.

In addition, both layers 542 and 544 extend over the entire torsion region 545 in the case of the torsion region 545 shown in FIG. 5. However, it is also possible for one of the layers 542 and 544 or both layers to not extend over the entire torsion region 545. A torsion region can be made up of partial layers which comprise different materials. This increases the manufacturing outlay for the torsion region 545 of the probe 555, but it produces new degrees of freedom for adapting the torsion region 545 to various requirements, such as for example the resonant frequency of the probe 555 and the pivot angle of the measurement tip 530. In addition, first partial layers of the torsion region 545 which are arranged for example in the proximity of the measurement tip 530 can be used for approximate deflection of the measurement tip 530. Second partial layers of the torsion region 545, which are arranged closer to the attachment unit 550 within the torsion region 545 can be used for the fine alignment of the measurement tip 530.

Moreover, both layers 542 and 544 fill the entire area of the torsion region 545 in the example of FIG. 5. Another possibility is an arrangement in which one of the layers 542 and 544 is arranged only in one partial region of the torsion region 545 (not illustrated in FIG. 5). In addition, one of the layers 542 or 544 can be disposed in a plurality of partial areas within the torsion region 545 (likewise not shown in FIG. 5). This offers further degrees of freedom for matching a torsion region with a specific application.

For locally heating the torsion region 545, the laser beam 495 can be incident on the torsion region 545 at a position which has one or both of the layers 542 and 544. In addition, the different partial regions within which the two layers 542 and 544 are arranged can be irradiated individually with the laser beam 495. The different partial regions that have the two or more layers which are connected to one another can furthermore be selectively heated using different laser sources. In addition, it is possible to produce a plurality of laser beams from the laser beam 495 of the laser system 490 which are directed individually onto the different partial regions of the layers 542 and 544 (not illustrated in FIG. 5).

As already mentioned, the torsion region 545 represented in FIG. 5 extends over the entire cantilever 540. As a result, the cantilever 540 is simple and cost-effective in terms of manufacture. It is also possible to produce a cantilever 540 in which the torsion region 545 covers only a partial area of the cantilever 540 (not illustrated in FIG. 5).

In the example represented in FIG. 5, the laser beam 495 is directed at the position 560 onto the left-hand arm or beam of the torsion region 545 of the cantilever 540. The local heating at the position 560 leads to pivoting of the measurement tip 530 in the −x-direction or the +x-direction, depending on whether the material of the layer 542 or 544 has the greater coefficient of linear thermal expansion. If the surface topography 415 of the sample 410 to be examined requires the measurement tip 530 to tilt in the opposite direction, the laser beam 495 is directed onto a position of the right-hand beam of the torsion region 545, and the right-hand beam of the torsion region 545 is locally heated (not shown in FIG. 5).

Figure 6A:
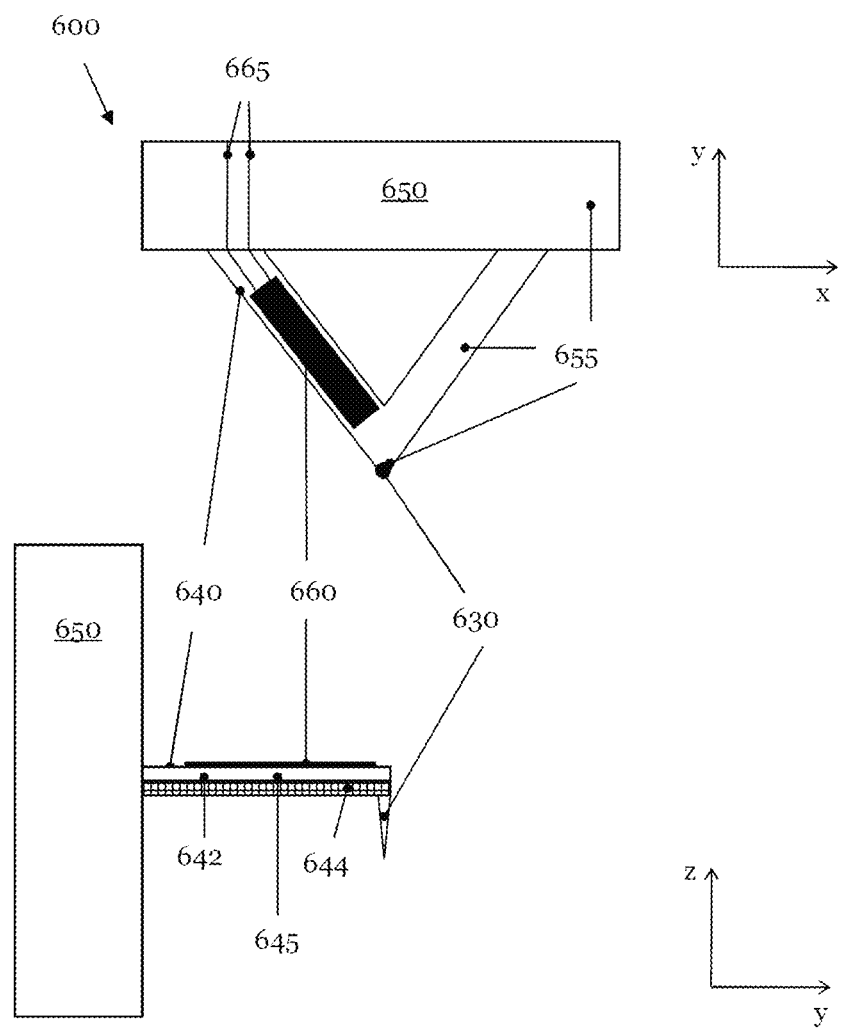
FIG. 6A shows the probe of FIG. 5 after a heating resistor has been placed on a beam of the V-shaped cantilever.

The diagram 600 in FIG. 6A presents a probe 655. This corresponds, in terms of dimensions and material composition, to the probe 555 of FIG. 5, that is it comprises the measurement tip 630, the cantilever 640 and the attachment unit 650. The torsion region 645 extends over the entire cantilever 640 and has two materials 642 and 644 having different coefficients of thermal expansion. In addition, the probe 650 has a heating apparatus in the form of a heating resistor 660, which is attached on an arm or a beam of the torsion unit 645 or cantilever 640. The heating resistor 660 can be configured for example in the form of a thin coating. The currently preferred material is aluminum. Aluminum has a high coefficient of thermal expansion and a relatively large electrical resistance. Other metals having similar properties can likewise be used.

Figure 6B:
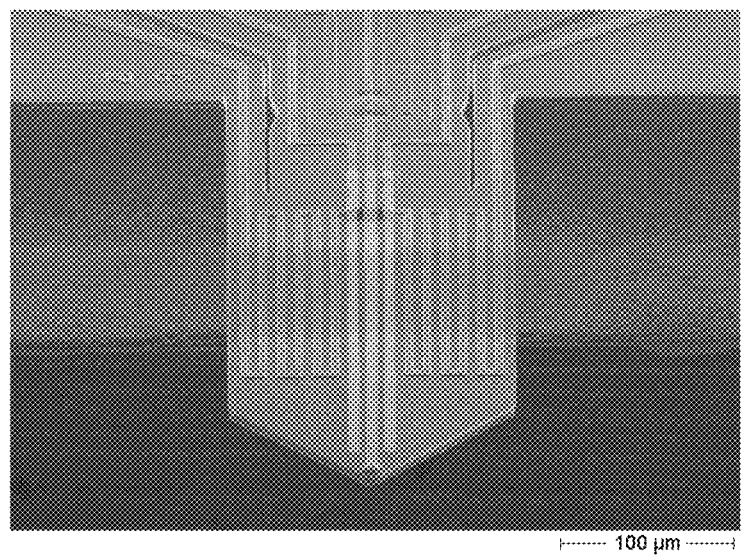
FIG. 6B shows heating resistors which are attached to the underside of the cantilever symmetrically with respect to a plane of symmetry that is formed by the measurement tip and the cantilever and which have the shape of folded electrical lines.

For the sake of simplicity, FIG. 6A illustrates the heating resistor 660 in the form of a rectangle. Typically, heating resistors have meandering electrical conductor structures. FIG. 6B shows the underside of a measurement probe with two heating resistors in the form of folded electrical conductors. The width of the conductors is in the range of a few micrometers. This length is typically a few hundred micrometers, for example 200 μm to 500 μm.

The mounting of a heating resistor on a cantilever 640 will be explained below with reference to an example. The exemplary cantilever 640 has a silicon layer of 4.6 μm thickness. This silicon layer is covered by silicon oxide with a thickness of 0.6 μm. In a first step, a thin chromium layer, (approximately 50 nm) is deposited on the silicon oxide layer as an adhesive layer. An aluminum layer of 1 μm thickness is deposited on the chromium layer in the form of the conductor structure illustrated in FIG. 6B, which acts as a heating resistor.

Heating resistors can also be produced by implanting dopants in a semiconducting cantilever 640. This process is described in the book "PRONANO: proceedings of the integrated project on massively parallel intelligent cantilever probe platforms for nanoscale analysis and synthesis," published by Thomas Sulzbach and Ivo W. Rangelow, Munster: Verlagshaus Monsenstein and Vannerdat, ISBN: 978-3-86991-177-9.

In the embodiment illustrated in FIG. 6A, the heating resistor 660 is applied in addition to the two layers 642 and 644 of the cantilever 640. However, it is also possible when applying a heating resistor 660 to dispense with one of the two layers 642 or 644. The heating resistor 660, which has a linear thermal expansion that differs from the layer 642 or 644 of the cantilever 640, in that case assumes the function of the second layer of the cantilever 640. It is also possible for a heating resistor 660 to be produced by way of implanting a dopant in the torsion region 645 of the cantilever 640.

The heating resistor 660 has two supply lines 665 which extend through the attachment unit 650 and connect the heating resistor 660 to the control device 480 via the connection 482.

The heating resistor 660 permits local heating of the beam of the torsion region 645 to which the heating resistor 660 is attached. Similarly, as explained in the context of the discussion of FIG. 5, the local heating of a beam of the torsion region 645 results in the measurement tip 630 tilting in the −x-direction or the +x-direction. The thermal time constant for establishing a thermal equilibrium within the cantilever 640 between local heat input by way of the heating resistor 660 and the heat dissipation by way of the attachment unit 650 is of the same order of magnitude as stated above. Owing to the low mass of the cantilever 640, a low electric power in a range of a few mW suffices (typically in the range of 2 mW to 10 mW) which is converted into heat by the heating resistor 660 for locally heating the torsion region 645.

The heating resistor 660 can be operated digitally, i.e. a specified voltage is applied to the heating resistor 660 when the control signal is applied, and the heating resistor 660 converts a defined electric power into a corresponding thermal energy. Alternatively, the heating resistor 660 can also operate in analog such that the electrical power loss of the heating resistor 660 can be set in accordance with the voltage applied to the supply lines 665. If the atomic force microscope illustrated in FIG. 4 is used, the heating resistor 660 can also be used in a closed feedback loop. The tilting of the measurement tip, which can be determined by use of an interferometer or a piezo-resistive sensor, here acts as the control variable. It is furthermore possible to ascertain the tilting of the measurement tip from the measurement of a temperature change in the torsion region.

In the example illustrated in FIG. 6A, the heating resistor 660 extends over a large portion of the area of a beam of the cantilever 640 and thus over a major portion of the torsion region 645. Alternatively, it is possible for the heating resistor to be concentrated onto a small portion of a torsion region 645 (not illustrated in FIG. 6A). The heating resistor 660 can furthermore be split over a plurality of smaller distributed heating resistors (likewise not illustrated in FIG. 6A). The smaller distributed heating resistors can be connected in series and thus be controlled using a single control signal. It is also possible to provide a plurality of heating resistors individually or in groups with supply lines and to thus operate them independently of one another. This way it becomes possible, for example, for a first heating resistor in the proximity of the measurement tip 630 to be used for an approximate deflection, and for a second heating resistor arranged near the attachment unit 650 to be used for fine adjustment of the deflection of the measurement tip 630, or vice versa.

In one alternative embodiment of the probe 655, the heating resistor 660 can be attached on the right-hand arm or a beam of the torsion region 645 of the recording unit 640.

In the example illustrated in FIG. 6A, only one heating resistor 660 is arranged on the left-hand beam of the torsion region 645. It permits active deflection of the measurement tip 630 in one of the directions –x or +x in dependence on the coefficient of linear thermal expansion of the layers 642 and 644. In order to make a pivoting of the measurement tip 630 in the opposite direction possible, a second heating resistor can be arranged on the right-hand beam of the torsion region 645 (not shown in FIG. 6A). This heating resistor can be configured in various forms, as discussed above in connection with the heating resistor 660.

In the example of FIG. 6A, the heating resistor 660 is attached on the torsion region 645. In one alternative form, the heating resistor 660 or the heating resistors can be attached to the underside of the torsion region 645 (not illustrated in FIG. 6A, but in FIG. 6B). This has the advantage that the heating resistor or resistors cannot influence the position of the laser beams 465 for determining the deflection of the recording unit 640. On the other hand, the heating resistor or resistors attached to the underside of the cantilever 640 slightly reduce the distance between the cantilever 640 and the surface 415 of the sample 410. It is also difficult to connect the supply lines 665 to the heating resistors without significantly affecting the distance between the cantilever 640 and the sample surface 415 in the region of the electrical connections of the heating resistors and supply lines 665.

In FIGS. 4 to 6A, and in the embodiments of a scanning probe microscope defined in this application, described below, it is additionally possible for one or more sensors to be attached on the cantilevers 440, 540, 640 (not illustrated in FIGS. 4 to 6A). These can be used to determine the extent of the torsion of the cantilever 440, 540, 640 and thus of the pivoting of the measurement tip 430, 530, 630. The sensor or sensors can be attached on the side of the heating resistor or resistors 660 or on the opposite side of the cantilever 440, 540, 640. The sensors can be configured for example in the form of piezo-resistive sensors which indicate bending of a cantilever arm by way of a change in voltage at their connections.

Figure 7:
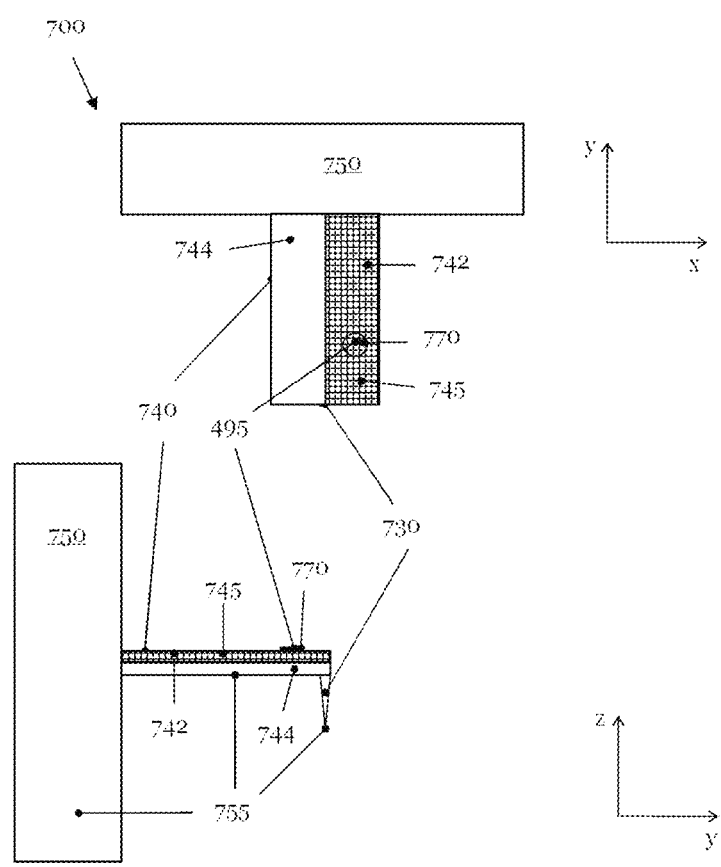
FIG. 7 schematically shows a plan view (top) and a section (bottom) through a probe of an atomic force microscope with a beam-shaped cantilever.

In FIGS. 4 to 6A, measurement probes for atomic force microscopes were described, having cantilevers of V-shaped configuration. However, the atomic force microscopes defined in this application can also use measurement probes having cantilevers of different configuration. The diagram 700 in FIG. 7 schematically shows a measurement probe 755, having a cantilever 740 in the form of a beam. The top part of FIG. 7 shows a plan view of the measurement probe 755, and the bottom part represents a section through the cantilever 740 and the measurement tip 730 of the probe 755. In addition to the measurement tip 730 and the cantilever 740, the probe 755 also has an attachment unit 750.

The cantilever 740 comprises a torsion region 745 which extends over the right-hand half of the cantilever 740. The beam of the cantilever 740 has a first layer 744 which takes up the entire length and width of the beam of the cantilever 740. A second layer 742 is applied on the right-hand half of the cantilever 740 (when observed in plan view). The two layers 742 and 744 have materials with different coefficients of linear thermal expansion. The area of the second layer 742 forms the torsion region 745 within the cantilever 740.

By locally heating the torsion region 745 at the position 770 using the laser beam 495 of the laser system 490, the torsion region 745 of the cantilever 740 undergoes torsion. As a result, the measurement tip 730 of the probe 755 pivots in the –x-direction or the +x-direction in dependence on the thermal constants of layers 742 and 744. By locally heating the left-hand portion of the beam of the cantilever 740 (i.e. the layer 744) with the aid of the laser beam 495, it is also possible to tilt the measurement tip 730 in the direction that is opposite to the tilting of the measurement tip 730 when the laser beam 495 is focused onto the torsion region 745. It is furthermore possible to separate the left-hand portion and the right-hand portion of the cantilever 740 by way of a slit to minimize the heat transport from one portion to the other portion of the cantilever 740.

However, when focusing the laser beam 495 onto the layer 744, the local heating of the layer 742 and thus of the torsion region 745 takes place only indirectly via the thermal conduction in the layer 744. As a result, when directing the laser beam 495 onto the layer 744, the torsion region 745 undergoes torsion more slowly, and the local heating additionally has a lower spatial resolution. It is therefore favorable to select the wavelength of the laser 490 such that the layer 744 is substantially transparent for the laser beam 495. For example, silicon is transparent in the infrared (IR) spectral range. Moreover, silicon nitride is substantially see-through.

In a similar manner as explained above in the context of FIG. 5, it is possible to select the position of incidence of the laser beam 495 to set the extent of the pivoting of the measurement tip 730. Furthermore, the torsion region 745 can be locally heated at a plurality of positions (not indicated in FIG. 7).

As already explained above, the torsion region 745 in the example illustrated in FIG. 7 extends only over the right-hand half of the recording unit 740. This produces the disadvantages explained above. In one preferred alternative embodiment, the torsion region 745 is therefore expanded to the entire recording unit 740 by way of the layer 742 likewise covering the entire cantilever 740 (not illustrated in FIG. 7). The sequence of the layers 742 and 744 can be swapped with respect to the illustration in FIG. 7. Similarly, to the torsion region 545 in FIG. 5, the torsion region 745 can have both layers 742 and 744 only in one partial area. Moreover, all modifications of the torsion region 545 that are discussed in connection with FIG. 5 are possible also for the torsion region 745 of FIG. 7.

Figure 8:
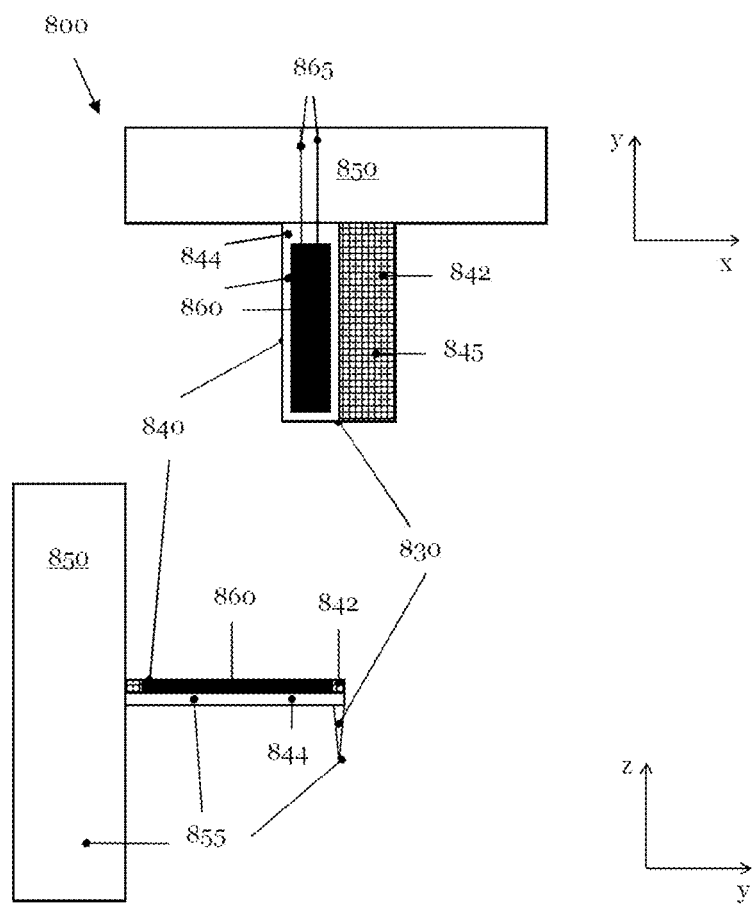
FIG. 8 depicts the probe of FIG. 7 after a heating resistor was attached to a portion of the cantilever.

The diagram 800 of FIG. 8 shows a measurement probe 855, at the top in a plan view, and at the bottom in a section through the cantilever 840 and the measurement tip 830. The measurement probe 855 corresponds to the probe 755 shown in FIG. 7. In addition, the measurement probe 855 has a heating apparatus in the form of a heating resistor 860, the supply lines 865 of which are guided through the attachment unit 850. The heating resistor 860 is applied on the left-hand half of the cantilever 840. Owing to a local heating of the layer 844, the torsion region 845 undergoes torsion. The layer 844 guides the heat received in the left-hand portion into the right-hand portion of the layer 844, and from there into the layer 842, which results in a local heating of the two layers 842 and 844 and ultimately in tilting of the measurement tip 830. As already explained in the context of the discussion of FIG. 7, the direction of the pivoting of the measurement tip 830 is dependent on the thermal constants of the materials of the layers 842 and 844.

As is likewise explained in the context of the discussion of FIG. 7, the heating resistor 860 heats the torsion region 845 only indirectly and thus with the above-stated disadvantages. In one alternative preferred embodiment of the measurement probe 855, the heating resistor 860 can be attached on the right-hand half of the cantilever 840, which results in direct local heating of the torsion region. As explained above, the heating resistor 860, whose thermal expansion is typically different from the thermal expansion of the layers 842 and 844, can assume the function of the second layer 842, with the result that the layer 842 can be dispensed with (not illustrated in FIG. 8).

In order to permit tilting of the measurement tip 830 both in the −x-direction and in the +x-direction, it is advantageous to attach a second, largely identical heating resistor on the right-hand half of the beam of the recording unit 840 (not shown in FIG. 8, cf. FIG. 6B).

In the example illustrated in FIG. 8, the heating resistor 860 covers most of the left-hand portion of the recording unit 840. As explained in connection with a discussion of FIG. 6A, the heating resistor 860 and/or a second heating resistor on the right-hand half of the recording unit 840 can be split into a plurality of smaller heating resistors which are placed at different locations, at different locations of the recording unit (not illustrated in FIG. 8). FIG. 6B shows an arrangement of heating resistors that is symmetric with respect to the plane of symmetry (y-z-plane).

The various heating resistors that can replace the heating resistor 860 can be driven individually, together, or in groups. If the various resistors are individually connected to the control device 480, various heating resistors can be used for approximate deflection and fine deflection of the measurement tip 830. The heating resistor or resistors can be attached, as illustrated in FIG. 8, on or below the cantilever 840.

If a second, substantially identical resistor 860 is applied on the measurement probe 855, which is illustrated in FIG. 8, on the torsion region 845, the asymmetry remains, in that the heating resistor 860 attached on the layer 844 only indirectly heats the torsion region 845—in contrast to the heating resistor arranged on the layer 842. This asymmetry can be removed by expanding the layer 842 over the entire layer 844, as a result of which the torsion region 845 extends over the entire cantilever 840. This asymmetry can furthermore be avoided by attaching, instead of the second layer 842 on or under the cantilever 840 symmetric with respect to the plane of symmetry of the measurement probe 855, heating resistors above and/or below the cantilever 840 (cf. FIG. 6B).

Figure 9:
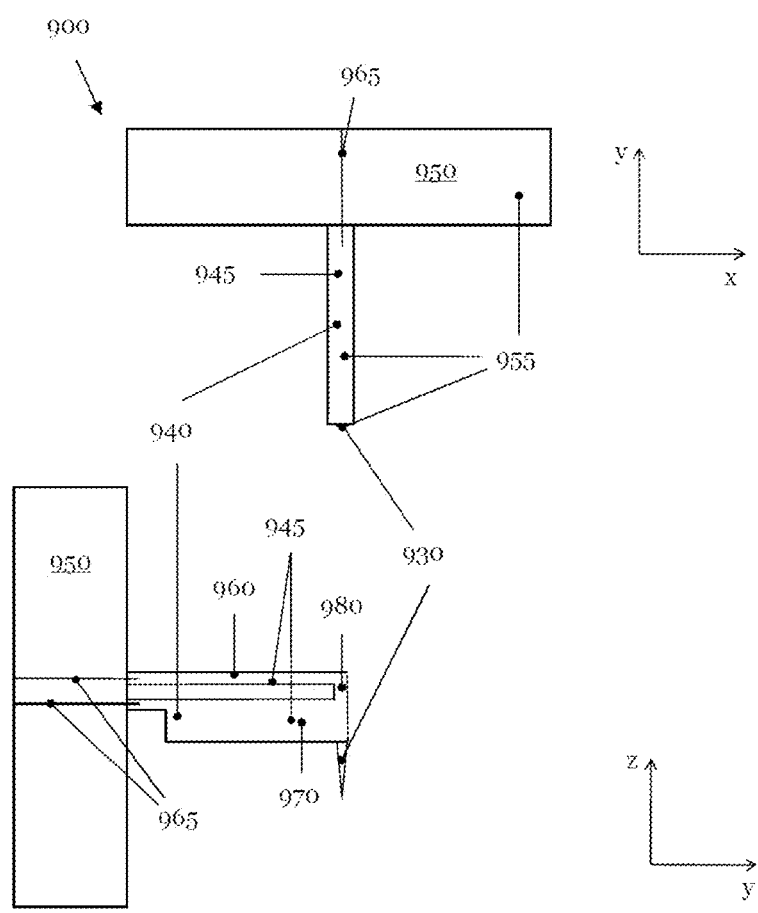
FIG. 9 schematically illustrates a plan view (top) and a section (bottom) through a probe of an atomic force microscope, the cantilever of which has only one material.

The diagram 900 in FIG. 9 represents a measurement probe 955. This has a cantilever 940, at one end of which the measurement tip 930 is attached and which is attached by its opposite end to the attachment unit 950. Similar to FIGS. 5 to 8, FIG. 9 shows in the top portion a plan view of the measurement probe 955, and in the bottom portion a section through the cantilever 940 and the measurement tip 930. In contrast to the cantilevers 540, 640, 740 and 840 of FIGS. 5 to 8, the cantilever 940 in FIG. 9 has only a single material. Semiconductor materials, in particular silicon, are preferred materials for the cantilever 940.

The cantilever 940 comprises 2 legs 960 and 970 which are attached to the attachment unit 950. The two legs 960 and 970 are connected to each other in the region of the measurement tip 930 via a thin connecting web 980. The upper leg 960 and the lower leg 970 are connected via the supply lines 965 and 482 to the control device 480 of the atomic force microscope 400.

Over most of the length of the cantilever 940, the lower leg 970 is wider by a multiple than the upper leg 960. As can be gathered from the top portion of FIG. 9, the upper leg 960 and the lower leg 970 of the cantilever 940 of the measurement probe 955 have the same thickness. Due to the geometry, the lower leg 970 has an ohmic resistance which is several times smaller than the ohmic resistance of the upper leg 960. The torsion region 945 extends in the case of the measurement probe 955 over the entire cantilever 940.

When a voltage is applied to the supply lines 482 and 965 by the control device 480, the two legs 960 and 970 heat in a non-uniform manner. The upper leg 960 heats significantly more strongly than the lower leg 970 and therefore has a stronger expansion than the lower leg 970. In a first approximation, the upper leg 960 has a first temperature and the lower leg 980 has a second temperature, wherein the first temperature is greater than the second temperature. As a result, the measurement tip 930 of the probe 955 is tilted in the direction of the negative y-direction.

Due to the geometry of the cantilever 940, only tilting of the measurement tip 930 in the negative y-direction is possible. In addition, the larger mass of the cantilever 940 means that the thermal time constant is greater than for the cantilevers 540, 640, 740 and 840.

Figure 10:
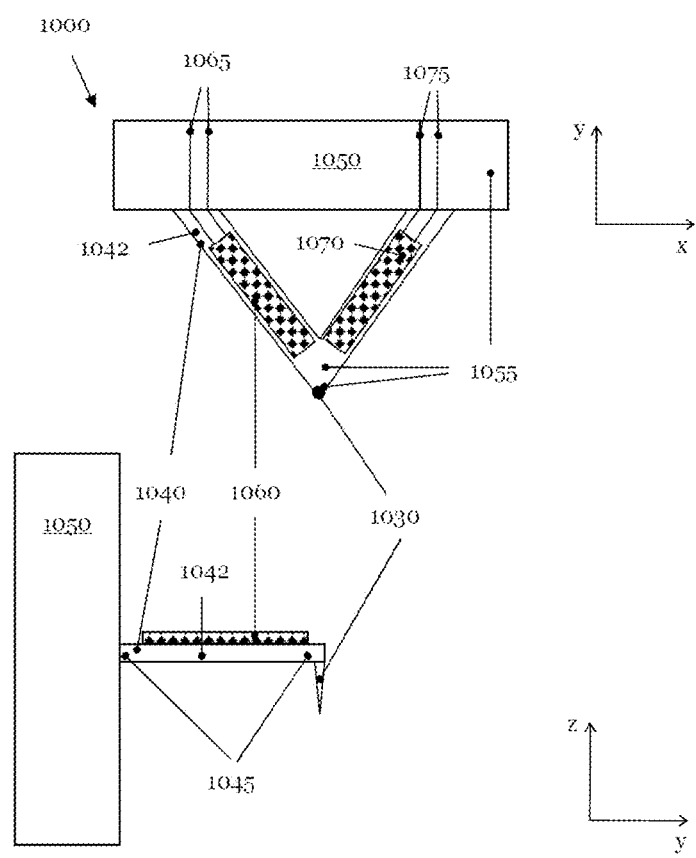
FIG. 10 schematically shows a plan view (top) and a section (bottom) through a probe of an atomic force microscope, wherein the torsion region of a cantilever comprises two piezo actuators.

The diagram 1000 in FIG. 10 shows a measurement probe 1055 having a cantilever 1040, whose torsion region 1045 comprises two piezo actuators 1060 and 1070. The cantilever 1040 is V-shaped, similar to the FIGS. 4 to 6. The measurement tip 1030 is arranged at the tip of the V-shaped cantilever 1040. At the opposite end, the cantilever 1040 is attached to the attachment unit 1050 of the measurement probe 1055. The cantilever 1040 has a substantially uniform material layer 1042. In each case one piezo actuator 1060 and 1070 is applied on the material layer on the left-hand beam and on the right-hand beam of the cantilever 1040. The piezo actuators are connected to the control device 480 of the atomic force microscope 400 by the supply lines 1065 and 1075 and 482.

Piezo actuators can be arranged on the cantilever 1040 for example in the form of zinc oxide (ZnO) actuators, as described above for the heating resistors. This is described by way of example by the authors S. R. Manalis, S. C. Minne and C. F. Quate in the article "Atomic force microscopy for high speed imaging using cantilevers with an integrated actuator and sensor," Appl. Phys. Lett. 68, 871 (1996). Generally speaking, for depositing or implanting piezo actuators 1060, 1070, use is made almost exclusively of integrated manufacturing methods from the semiconductor industry and the MEMS (microelectromechanical system) manufacturing. Usually, piezo actuators change in terms of the dimensions in the longitudinal direction when an electric voltage is applied. However, it is also conceivable to apply piezo actuators having a complex geometry on the cantilever 1040, which can change in one spatial direction (for example the longitudinal direction), two spatial directions (for example in the two lateral directions), or three spatial directions (i.e. both in the longitudinal direction and in the lateral directions).

A torsion region 1045 in the form of one or more piezo actuators 1060, 1070 has the advantage that the measurement tip 1030 can be deflected quickly in a positive or a negative direction. The response time of the piezo actuators 1060, 1070 is limited by their relatively large capacitance, which results in current flow in the case of applied voltage changes. The capacitance of the piezo actuators in connection with the resistance of the supply lines 1065 limits the response of the measurement tip 1030 to a change in the voltage signal applied to the supply lines 1065.

The measurement probe 1055 shown in FIG. 10 has a piezo actuator 1060, 1070 on both arms or beams of the cantilever 1040. As a result, pivoting of the measurement tip in the −x-direction and the +x-direction is possible. The use of a piezo actuator 1060, 1070 as the torsion region 1045 is generally sufficient, because a piezo actuator 1060, 1070 can typically bend in its longitudinal direction on both sides of its equilibrium configuration.

Similarly, as described in the context of the heating resistors 660 and 860, the large piezo actuators 1060, 1070 can be replaced by a plurality of smaller piezo actuators, for example in order to perform an approximate deflection and a fine deflection of the measurement tip 1030 in a defined manner.

Figure 11:
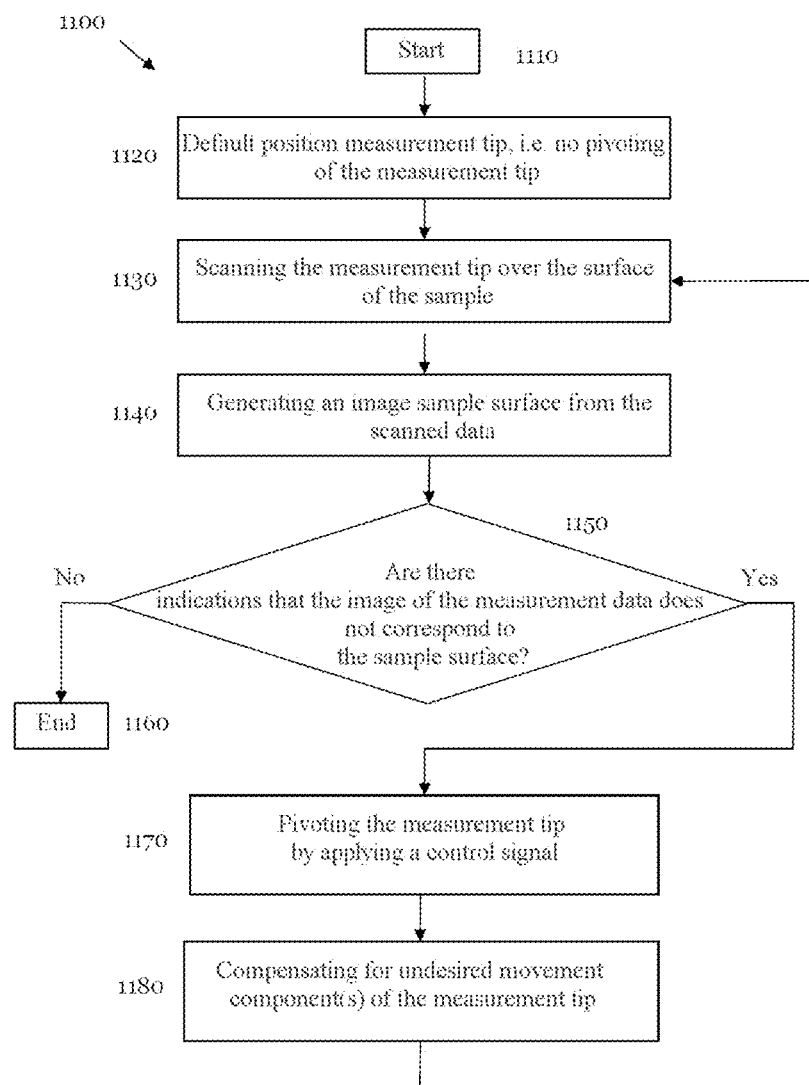
FIG. 11 shows a flowchart of a first embodiment of a method for scanning a sample surface with a high aspect ratio using a scanning probe microscope with a pivotable measurement tip.

FIG. 11 shows a flowchart 1100 of a first embodiment of a method which uses a scanning probe microscope 400 with a pivotable measurement tip 530, 630, 730, 830, 930 or 1030 for examining a sample surface 415 which has a high aspect ratio. The method begins at 1110. In the first step 1120, the measurement tip 530, 630, 730, 830, 930 or 1030 is brought into the default position, i.e. the position in which the measurement tip is not tilted. In step 1130, a scanning probe microscope 400 scans the measurement tip 530, 630, 730, 830, 930, 1030 over a region to be examined of a sample surface 415. In step 1140, an image of the examined sample surface 415 is generated from the data gathered by the scan. In the decision step 1150, the generated image is analyzed and a decision is made as to whether indications are present in the image that the measurement tip 530, 630, 730, 830, 930, 1030 was not able to realistically scan the sample surface 415. If this is not the case, the method ends at step 1160.

However, if the analysis step 1150 gives indications that the generated image does not substantially correspond to the sample surface 415, then in step 1170 the measurement tip 530, 630, 730, 830, 930, 1030 is pivoted by a defined angle by way of application of a control signal. The three-dimensional contour of the measurement tip is normally known. The three-dimensional contour data can be provided by the manufacturer of the measurement tip. Alternatively, the contour of the measurement tip can be determined by a measurement for example by use of a scanning electron microscope. In addition, the contour of the measurement tip 530, 630, 730, 830, 930, 1030 can be ascertained by scanning a sample with a known surface topography. Since the measurement tip is subject to wear, it may be necessary to determine the contour of the measurement tip 530, 630, 730, 830, 930, 1030 again from time to time. The author J. S. Villarubbia in the article "Algorithms for Scanned Probe Microscope Image Simulation, Surface Reconstruction, and Tip Estimation" in J. Res. Natl. Inst. Stand. Technol., Vol. 102, No. 4, July-August, pages 425-454, describes in detail how the topography of a sample surface can be determined from the measured image data of the sample surface with known contour of the measurement tip.

Indications of a non-realistic image of the sample surface 415 are present for example if the change in the sample surface 415, i.e. its surface topography, in at least one portion of the region to be examined of the sample 410 comes close to the contour of the measurement tip or reaches it. The direction in which the measurement tip pivots for the second scan operation can also be gathered from the analysis of the image generated from the measurement data.

At step 1180, the undesired movement components of the measurement tip 530, 630, 730, 830, 930, 1030 caused by the pivoting are corrected. One undesired movement component of the measurement tip is, for example, a change in the distance between the measurement tip 530, 630, 730, 830, 930, 1030 and the sample surface 415 and/or a change in the lateral position of the measurement tip relative to the sample surface.

In the next step 1130, the region of the sample surface 415 to be examined is scanned again with a pivoted measurement tip 530, 630, 730, 830, 930, 1030. If the generated image contains no indications of a resolution limitation due to the measurement tip, the method ends at 1160. If this is not the case, the above described process is repeated with a changed pivot of the measurement tip. The image generated after the second scan operation is composed of scanning data of the first data recorded with a non-pivoted measurement tip and the second data recorded with a pivoted measurement tip.

Figure 12:
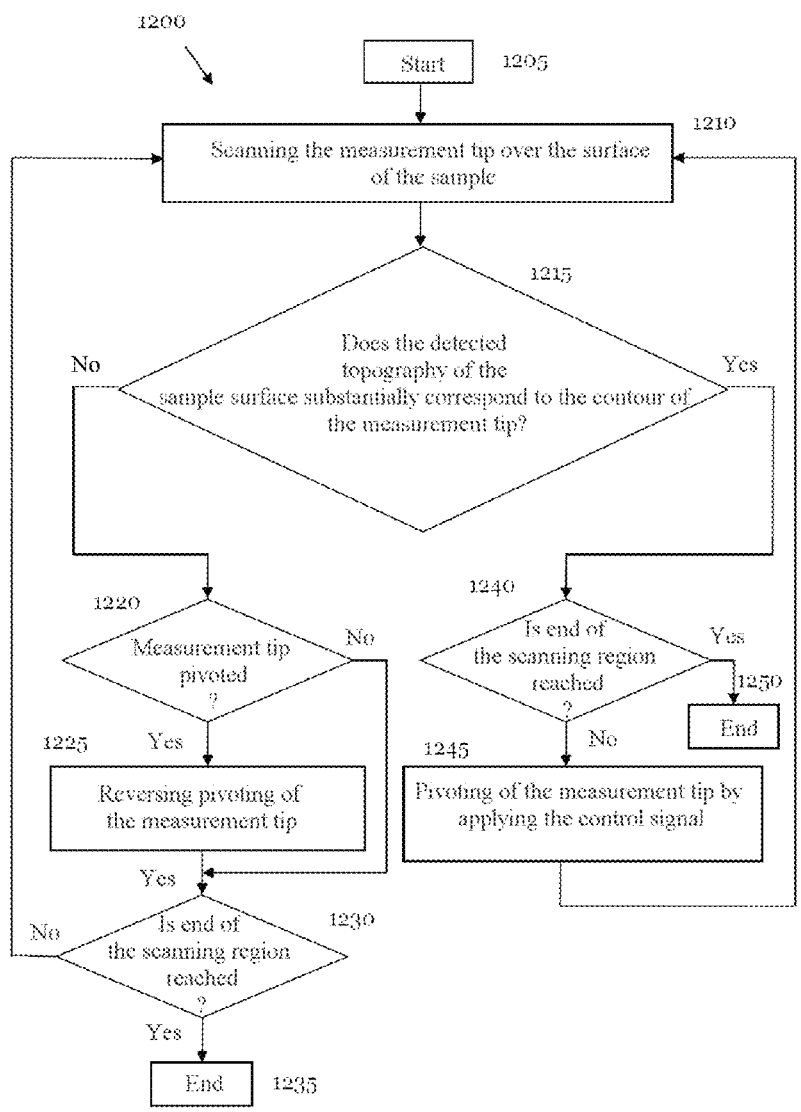
FIG. 12 depicts a flowchart of a second embodiment for a method for examining a surface of a sample with a high aspect ratio using a scanning probe microscope with a pivotable measurement tip.

Finally, FIG. 12 shows a flowchart 1200 of a second embodiment of a method which uses a scanning probe microscope 400 having a pivotable measurement tip 530, 630, 730, 830, 930, 1030 to examine a sample surface 415 with a high aspect ratio. The method starts at step 1205. In the first step 1210, a scanning probe microscope 400 scans a measurement tip 530, 630, 730, 830, 930, 1030 over a region of a sample surface 415 to be examined. At the decision block 1215, a decision is made as to whether or not the measurement tip 530, 630, 730, 830, 930, 1030 is currently scanning a region of the sample surface 415 which has a high aspect ratio. This decision can be made for example on the basis of a comparison of the just detected topography of the sample surface 415 with the contour of the measurement tip 530, 630, 730, 830, 930, 1030.

If the question of the decision step 1215 is answered yes, then a decision is made in a decision step 1240 as to whether the measurement tip 530, 630, 730, 830, 930, 1030 has reached the end of the scan region. If this is the case, the method ends with step 1250. If this is not the case, the control device 480 in step 1245 pivots the measurement tip 530, 630, 730, 830, 930, 1030 by applying a corresponding control signal. The method then proceeds to step 1210 and scans the pivoted measurement tip 530, 630, 730, 830, 930, 1030 over the sample surface 415.

If the decision in the decision step 1215 is that the measurement tip 530, 630, 730, 830, 930, 1030 scans a region which does not have a high aspect ratio, the method continues at the decision step 1220, in which it is detected whether or not the measurement tip 530, 630, 730, 830, 930, 1030 is pivoted. If the measurement tip 530, 630, 730, 830, 930, 1030 is not pivoted, a determination is made in the decision step 1230 as to whether or not the measurement tip 530, 630, 730, 830, 930, 1030 has reached the end of the scan region. If this is the case, the method ends with step 1235. If not, the method continues at step 1210, and the measurement tip 530, 630, 730, 830, 930, 1030 continues to scan over the sample surface 415.

If a determination is made in the decision step 1220 that the measurement tip 530, 630, 730, 830, 930, 1030 is pivoted, the tilting of the measurement tip 530, 630, 730, 830, 930, 1030 is reversed in step 1225. The method then continues at the decision step 1230 and either ends at step 1235 or continues to scan the sample surface with a non-pivoted measurement tip 530, 630, 730, 830, 930, 1030 in step 1210.

What is claimed is:

1. A scanning probe microscope, having:
   a. a scanning device for scanning a measurement tip over a surface;
   b. a cantilever for the measurement tip, wherein the cantilever has a torsion region;
   c. wherein the torsion region is configured such that it undergoes torsion when a control signal is applied and thereby pivots the measurement tip; and
   d. a control device for determining, when the measurement tip scans a region of the surface, whether the region can be examined more closely with a pivoted measurement tip than without pivoting the measurement tip, and outputting the control signal in response to a determination that the region of the surface can be examined more closely with the pivoted measurement tip than without pivoting the measurement tip, wherein the scanning device is configured to extend a distance feedback loop means for the z-movement to a z-x-movement to monitor a distance between the surface and the measurement tip along a z-x plane based on at least one parameter measured by the scanning device, wherein the x-direction indicates a fast scan direction, and the z-direction is perpendicular to the surface,
   wherein the control device is configured to generate an image of the region of the surface based on data gathered from a first scan of the region of the surface, and analyze the image to determine whether indications are present in the image that the measurement tip was not able to realistically scan the region of the surface in which a detected topography of a portion of the region of the surface is similar to or the same as a contour of the measurement tip,
   wherein the control device is configured to, upon determining that indications are present in the image that the measurement tip was not able to realistically scan the region of the surface, cause the measurement tip to have a first pivot angle and perform a second scan of the region of the surface with the measurement tip having the first pivot angle,
   wherein the control device is configured to generate a second image of the region of the surface based on data gathered from the second scan of the region of the surface, and analyze the second image to determine whether indications are present in the second image that the measurement tip was not able to realistically scan the region of the surface, and
   wherein the control device is configured to, upon determining that indications are present in the second image that the measurement tip was not able to realistically scan the region of the surface, cause the measurement tip to have a second pivot angle and perform a third scan of the region of the surface with the measurement tip having the second pivot angle.

2. The scanning probe microscope as claimed in claim 1, wherein the torsion region comprises at least in a partial region at least two material layers that are connected to one another and have different coefficients of thermal expansion.

3. The scanning probe microscope as claimed in claim 2, wherein the torsion region comprises at least a first region having at least two first material layers, which are connected to one another, for setting a rough pivoting movement of the measurement tip, and at least a second region having at least two second material layers, which are connected to one another, for setting a fine pivoting movement of the measurement tip, or wherein the torsion region comprises at least 2 partial regions with implanted material for setting a rough pivoting movement and a fine pivoting movement of the measurement tip.

4. The scanning probe microscope as claimed in claim 2, wherein the region of the at least two material layers, which are connected to one another, or the at least one partial region of implanted material extends over the entire cantilever.

5. The scanning probe microscope as claimed in claim 2, wherein at least one of the at least two material layers, which are connected to one another, or at least a partial region of implanted material comprises a heating resistor.

6. The scanning probe microscope as claimed in claim 1, wherein at least a partial region of the torsion region comprises implanted material such that the partial region and the torsion region have different coefficients of thermal expansion.

7. The scanning probe microscope as claimed in claim 1, wherein the torsion region has a material in an arrangement that is configured to, when the control signal is applied, keep a first part of the arrangement substantially at a first temperature, and to keep a second part of the arrangement substantially at a second temperature, wherein the first and second temperatures differ.

8. The scanning probe microscope as claimed in claim 1, furthermore having a laser system which is configured to locally heat the torsion region when the control signal is applied.

9. The scanning probe microscope as claimed in claim 1, furthermore having a heating apparatus which is configured to locally heat the torsion region when the control signal is applied.

10. The scanning probe microscope as claimed in claim 1, wherein the torsion region comprises at least one piezo actuator.

11. The scanning probe microscope as claimed in claim 1, wherein the control device is configured to modulate the control signal to excite the measurement tip to oscillate.

12. The scanning probe microscope as claimed in claim 1, wherein the torsion region is configured to pivot the measurement tip at an angle range of ±5°.

13. The scanning probe microscope as claimed in claim 1, wherein the cantilever and the measurement tip have a resonant frequency in the range of 100 Hz-5 MHz.

14. The scanning probe microscope as claimed in claim 1, wherein the scanning device is configured to add a signal of the z-movement to a signal for the x-movement.

15. The scanning probe microscope as claimed in claim 1, wherein the cantilever is connected to an attachment unit in which electrical connections are integrated that lead to the torsion region.

16. The scanning probe microscope as claimed in claim 1, wherein the cantilever has at least one sensor for determining the pivoting of the measurement tip.

17. The scanning probe microscope of claim 1 in which the torsion region is configured to pivot the measurement tip at an angle range of at least one of ±10°, ±15°, or ±20°.

18. The scanning probe microscope of claim 1 in which the cantilever and the measurement tip have a resonant frequency in the range of 500 Hz-1 MHz.

19. The scanning probe microscope of claim 1 in which the cantilever and the measurement tip have a resonant frequency in the range of 1 kHz-500 kHz.

20. The scanning probe microscope of claim 1 in which the cantilever and the measurement tip have a resonant frequency in the range of 2 kHz-200 kHz.

21. The scanning probe microscope of claim 1 in which the control device causes the measurement tip to have a first pivot angle during a first scan and a second pivot angle during a second scan in which the second pivot angle is different from the first pivot angle.

22. The scanning probe microscope of claim 1 in which the control device is configured to determine whether the region can be examined more closely with a pivoted measurement tip than without pivoting the measurement tip by at least in part determining whether a detected surface topography in at least one portion of the region is similar to or the same as the contour of the measurement tip.

23. The scanning probe microscope of claim 1 in which the control device is configured to determine whether the region can be examined more closely with a pivoted measurement tip than without pivoting the measurement tip by at least in part determining whether the region has a high aspect ratio that is greater than a predetermined value.

24. The scanning probe microscope of claim 1 in which the scanning device is configured to implement the distance feedback loop for the z-x-movement to monitor the distance between the surface and the measurement tip along the z-x plane based on at least one of a tunnel current between the surface and the measurement tip, a deflection of the measurement tip, a magnetic force between the surface and the measurement tip, evanescent electromagnetic waves indicating interaction between the surface and the measurement tip, or acoustic near-field interactions between the surface and the measurement tip.

25. A method for examining a surface with a high aspect ratio, including:
   a. scanning a measurement tip over the surface, wherein the measurement tip is attached to a cantilever, and the cantilever has a torsion region;
   b. making a decision regarding, when the measurement tip scans a region of the surface, whether the region can be examined more closely with a pivoted measurement tip than without pivoting the measurement tip on the basis of a comparison of a just detected topography of the surface with a contour of the measurement tip;
   c. applying a control signal upon making the decision that when the measurement tip scans the region of the surface, the region can be examined more accurately with the pivoted measurement tip than without pivoting the measurement tip;
   d. in response to the control signal, subjecting the torsion region to torsion for pivoting the measurement tip;
   e. on the basis of a detected topography of the surface, deciding whether the measurement tip is pivoted;
   f. generating the just detected topography of the surface based on data gathered from a first scan of the surface, and analyzing the just detected topography and the contour of the measurement tip to determine whether indications are present in the just detected topography that the measurement tip was not able to realistically scan the surface in which the just detected topography is similar to or the same as a contour of the measurement tip;
   g. upon determining that indications are present in the just detected topography of the surface that the measurement tip was not able to realistically scan the region of the surface, causing the measurement tip to have a first pivot angle and performing a second scan of the region of the surface with the measurement tip having the first pivot angle,
   h. generating a second just detected topography of the surface based on data gathered from the second scan of the region of the surface, and analyzing the second just detected topography of the surface to determine whether indications are present in the second just detected topography of the surface that the measurement tip was not able to realistically scan the region of the surface, and
   i. upon determining that indications are present in the second just detected topography of the surface that the measurement tip was not able to realistically scan the region of the surface, causing the measurement tip to have a second pivot angle and performing a third scan of the region of the surface with the measurement tip having the second pivot angle.

26. The method as claimed in claim 25, wherein a scanning probe microscope is used for carrying out at least one of the method steps,
   the scanning probe microscope comprising:
      a scanning device for scanning the measurement tip over the surface;
      the cantilever having the torsion region, in which the torsion region is configured such that it undergoes torsion when the control signal is applied and thereby pivots the measurement tip; and
      a control device for outputting the control, in which the scanning device is configured to extend a distance feedback loop means for the z-movement to a z-x-movement, wherein the x-direction indicates a fast scan direction.

* * * * *

UNITED STATES PATENT AND TRADEMARK OFFICE
CERTIFICATE OF CORRECTION

PATENT NO. : 10,119,990 B2  
APPLICATION NO. : 15/386203  
DATED : November 6, 2018  
INVENTOR(S) : Christof Baur and Klaus Edinger Page 1 of 1

It is certified that error appears in the above-identified patent and that said Letters Patent is hereby corrected as shown below:

On the Title Page

Column 2 (item (56) Other Publications), Line 3, delete "PROPANO" and insert -- PRONANO --.

Signed and Sealed this  
Ninth Day of April, 2019

Andrei Iancu  
*Director of the United States Patent and Trademark Office*